(12) United States Patent
Cho et al.

(10) Patent No.: US 10,903,973 B2
(45) Date of Patent: *Jan. 26, 2021

(54) DISTRIBUTED ANTENNA SYSTEM FOR TIME DIVISION DUPLEX

(71) Applicant: SOLiD, INC., Seongnam-si (KR)

(72) Inventors: Yongki Cho, Yongin-si (KR); Yeongshin Yeo, Gwangmyeong-si (KR)

(73) Assignee: SOLiD. INC., Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/700,581

(22) Filed: Sep. 11, 2017

(65) Prior Publication Data

US 2018/0013538 A1    Jan. 11, 2018

Related U.S. Application Data

(63) Continuation of application No. 15/079,880, filed on Mar. 24, 2016, now Pat. No. 9,774,438, which is a (Continued)

(30) Foreign Application Priority Data

Dec. 30, 2014  (KR) .................. 10-2014-0194364
Feb. 17, 2015  (KR) .................. 10-2015-0024194

(51) Int. Cl.
*H04L 5/14* (2006.01)
*H04B 1/525* (2015.01)
(Continued)

(52) U.S. Cl.
CPC ................. *H04L 5/14* (2013.01); *H04B 1/52* (2013.01); *H04B 1/525* (2013.01); *H04B 7/15564* (2013.01); *H04L 5/1469* (2013.01)

(58) Field of Classification Search
CPC .......... H04B 1/005–0096; H04B 1/525; H04B 7/15564–15585; H04L 5/14–16
See application file for complete search history.

(56) References Cited

U.S. PATENT DOCUMENTS 7,961,689 B2   6/2011  Stratford
8,208,414 B2   6/2012  Singh et al.
(Continued)

FOREIGN PATENT DOCUMENTS

KR   10-2006-0098505   9/2006
KR   10-2007-0058899   6/2007

OTHER PUBLICATIONS

International Search Report issued in PCT/KR2015/013239 dated Dec. 4, 2015.
(Continued)

*Primary Examiner* — Marcus Smith
(74) *Attorney, Agent, or Firm* — Sughrue Mion, PLLC

(57) ABSTRACT

According to an example embodiment of the inventive concept, a master unit for time division duplex includes a passive signal distributor for outputting, to a second node, a downlink signal input through a first node, and outputting, to the first node, an uplink signal input through a third node, and a signal transceiver for transmitting, to a remote unit, the downlink signal input from the second node, and outputting, to the third node, an uplink amplification signal received from the remote unit.

9 Claims, 4 Drawing Sheets

Related U.S. Application Data continuation of application No. PCT/KR2015/013239, filed on Dec. 4, 2015.

(51) Int. Cl.
*H04B 1/52* (2015.01)
*H04B 7/155* (2006.01)

(56) References Cited

U.S. PATENT DOCUMENTS

| | | | |
|---|---|---|---|
| 8,385,373 | B2 | 2/2013 | Stratford et al. |
| 8,626,238 | B2 | 1/2014 | Stratford et al. |
| 8,755,399 | B1 | 6/2014 | Van Buren et al. |
| 2006/0035600 | A1 | 2/2006 | Lee et al. |
| 2008/0008126 | A1* | 1/2008 | Shirakabe ............ H04B 7/2615 370/329 |
| 2009/0325481 | A1* | 12/2009 | Mohebbi .............. H04B 7/1555 455/15 |
| 2011/0216815 | A1* | 9/2011 | Choi ...................... H04B 1/525 375/219 |
| 2012/0052892 | A1 | 3/2012 | Braithwaite |
| 2013/0077502 | A1* | 3/2013 | Gainey ............. H04B 7/15578 370/252 |
| 2013/0122802 | A1* | 5/2013 | Wang ................. H04B 7/15535 455/9 |
| 2013/0188753 | A1 | 7/2013 | Tarlazzi et al. |
| 2013/0273841 | A1* | 10/2013 | Liu .................... H04B 7/15557 455/15 |
| 2015/0038185 | A1 | 2/2015 | Saban et al. |
| 2015/0296527 | A1 | 10/2015 | Ranson et al. |
| 2016/0095002 | A1 | 3/2016 | Zhan et al. |
| 2016/0294466 | A1* | 10/2016 | Xu ........................... H04B 1/04 |
| 2018/0270006 | A1* | 9/2018 | Gao ......................... H04B 1/48 |
| 2018/0375566 | A1* | 12/2018 | Hong ................. H04B 7/15585 |

OTHER PUBLICATIONS

Written Opinion issued in PCT/KR2015/013239 dated Mar. 28, 2016.

Office Action issued in parent U.S. Appl. No. 15/079,880 dated Jul. 22, 2016.

Office Action issued in parent U.S. Appl. No. 15/079,880 dated Feb. 10, 2017.

Notice of Allowance issued in parent U.S. Appl. No. 15/079,880 dated May 30, 2017.

* cited by examiner

DISTRIBUTED ANTENNA SYSTEM FOR TIME DIVISION DUPLEX

CROSS REFERENCE TO RELATED APPLICATIONS

This application is a continuation of U.S. application Ser. No. 15/079,880 filed on Mar. 24, 2016, which is a continuation of International Application No. PCT/KR2015/013239, filed Dec. 4, 2015, and based upon and claims the benefit of priorities from Korean Patent Applications No. 10-2014-0194364 filed Dec. 30, 2014 and No. 10-2015-0024194 filed Feb. 17, 2015, the contents of which are incorporated herein by reference in their entireties.

BACKGROUND

1. Field

The inventive concept relates to a distributed antenna system, and more particularly, to a distributed antenna system for time division duplex (TDD).

2. Description of Related Art

As wireless multimedia services, social networking services (SNS), internet of things (IoT), and the like come into wide use due to the spread of smartphones, the demand for wireless data traffic is explosively increasing. A big data environment has emerged which is not easily processed by using the existing data transmission method. Accordingly, a distributed antenna system (DAS) in which one master unit (MU) linked with base stations can control remote units (RUs) that are a plurality of antenna modules connected to the MU through an optical cable is used to efficiently manage wireless resources.

Meanwhile, in recent wireless mobile communication, a technique using time division duplex (TDD) as a duplex scheme has been widely used. Here, the TDD refers to a bidirectional transmission scheme in which uplink and downlink are alternately allocated in the same frequency band according to time sequence. The TDD has higher transmission efficiency than frequency division duplex (FDD) in which different two channels are allocated to the uplink and the downlink.

A conventional relay to which the TDD is applied should have a function of controlling a switch to perform a switching operation between downlink and uplink periods by analyzing a transmission signal frame. U.S. Pat. No. 8,208,414 discloses, as an invention related to a relay to which the TDD is applied, a method of controlling a switch as a master unit (MU) detects a downlink signal received from a remote unit (RU). According to U.S. Pat. No. 8,208,414, the MU requires a control signal for accurately distinguishing a start point of a downlink signal from a start point of an uplink signal and controlling opening/closing of the switch in response to each signal, thereby changing a transmission path of the signal.

In the conventional distributed antenna system, the MU requires a switch for alternately allocating uplink and downlink and a controller for controlling the switch, and hence a malfunction may occur due to defects of the switch and the controller. Also, the switch and the controller are relatively high-priced components, and hence the manufacturing cost of the relay is increased.

SUMMARY

An embodiment of the inventive concept is directed to a distributed antenna system for time division duplex, which does not requires a switch for changing the transmission path of a signal and a control signal for controlling the switch.

According to an aspect of the inventive concept, there is provided a master unit for time division duplexer, the master unit comprising: a passive signal distributor configured to output, to a second node, a downlink signal input through a first node, and output, to the first node, an uplink signal input through a third node; and a signal transceiver configured to transmit, to a remote unit, the downlink signal input from the second node, and output, to the third node, an uplink amplification signal received from the remote unit, wherein the passive signal distributor includes a circulator.

According to an exemplary embodiment, the master unit may further comprise a signal detector configured to detect an uplink leakage signal generated as the uplink amplification signal is leaked to the second node.

According to an exemplary embodiment, the master unit may further comprise an uplink signal controller configured to, if the uplink leakage signal is detected, adjust the power level of the uplink amplification signal to a predetermined level.

According to another aspect of the inventive concept, there is provided a remote unit for time division duplex, the remote unit comprising: a downlink signal amplifier configured to generate a downlink amplification signal by amplifying an input downlink signal, and output the downlink amplification signal to a fourth node; a passive signal distributor configured to output, to a fifth node, the downlink amplification signal input through the fourth node, and output, to a sixth node, an uplink signal input through the fifth node; an uplink signal amplifier configured to generate an uplink amplification signal by amplifying the uplink signal input from the sixth node, and output the uplink amplification signal; and a signal transceiver configured to output, to the downlink signal amplifier, a downlink signal received from a master unit, and transmit the uplink amplification signal to the master unit, wherein the passive signal distributor includes a circulator.

According to an exemplary embodiment, the remote unit may further comprise a downlink signal controller configured to, if the downlink signal is input from the signal transceiver, output a downlink mode notification signal; and a switch configured to, if the downlink mode notification signal is input, release the connection between the signal distributor and the uplink signal amplifier.

According to an exemplary embodiment, if the input of the downlink signal is ended, the downlink signal controller may output a downlink mode end signal, and if the downlink mode end signal is input, the switch may connect the signal distributor and the uplink signal amplifier to each other.

According to still another aspect of the inventive concept, there is provided a distributed antenna system for time division duplex, the distributed antenna system comprising: a master unit configured to transmit a downlink signal received from a base station; and a remote unit configured to generate a downlink amplification signal by amplifying the downlink signal, transmit the downlink amplification signal to the outside, and, if the downlink signal is received, not process an uplink signal received from a terminal, wherein the master unit includes: a master circulator configured to output, to a second node, the downlink signal input through a first node; and a master signal transceiver configured to transmit, to the remote unit, the downlink signal input from the second node, and wherein the remote unit includes: a remote signal transceiver configured to output the received downlink signal; a downlink signal amplifier configured to generate the downlink amplification signal by amplifying the input downlink signal, and output the downlink amplification signal to a fourth node; and a remote circulator configured to output, to a fifth node, the downlink amplification signal input through the fourth node.

According to an exemplary embodiment, the remote unit may further include an uplink signal amplifier configured to generate an uplink amplification signal by amplifying an uplink signal input from a sixth node, and output the uplink amplification signal. If the uplink signal received from the terminal is input to the fifth node, the remote circulator may output the uplink signal to the sixth node, and the remote signal transceiver may output the uplink amplification signal to the master signal transceiver.

According to an exemplary embodiment, the remote unit may further include a downlink signal controller configured to, if the downlink signal is input from the remote signal transceiver, output a downlink mode notification signal; and a switch configured to, if the downlink mode notification signal is input, release the connection between the remote circulator and the uplink signal amplifier.

According to an exemplary embodiment, if the detection of the downlink signal is ended, the downlink signal controller may output a downlink mode end signal, and if the downlink mode end signal is input, the switch may connect the signal distributor and the uplink signal amplifier to each other.

According to an exemplary embodiment, the master signal transceiver may output the received uplink amplification signal to a third node, and the master circulator may output, to the first node, the uplink amplification signal input through the third node.

According to an exemplary embodiment, the master unit may further include a signal detector an uplink leakage signal generated as the uplink amplification signal is leaked to the second node.

According to an exemplary embodiment, the master unit may further include an uplink signal controller configured to, if the uplink leakage signal is detected, adjust the power level of the uplink amplification signal to a predetermined level.

In the distributed antenna system for time division duplex according to the inventive concept, the transmission path of a signal is changed by using a passive element such as a circulator, and hence a switch for changing the transmission path of a signal and a control signal for controlling the switch are not required.

BRIEF DESCRIPTION OF THE FIGURES

Exemplary embodiments of the inventive concept will be more clearly understood from the following detailed description taken in conjunction with the accompanying drawings in which.

DETAILED DESCRIPTION OF EXEMPLARY EMBODIMENTS

Figure 1:
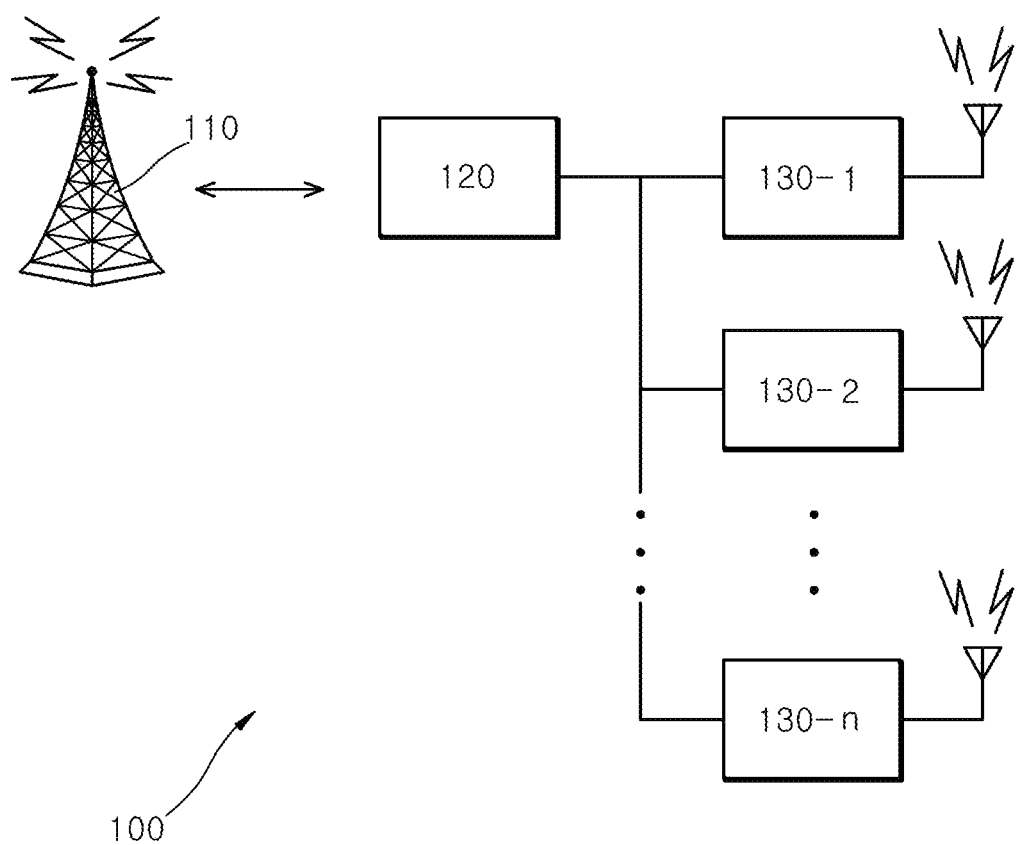
FIG. 1 is a configuration diagram showing a distributed antenna system according to an embodiment of the inventive concept.

Exemplary embodiments of the inventive concept will be described below in more detail with reference to the accompanying drawings. The inventive concept may, however, be embodied in different forms and should not be construed as limited to the embodiments set forth herein. Rather, these embodiments are provided so that this disclosure will be thorough and complete, and will fully convey the scope of the inventive concept to those skilled in the art. Throughout the disclosure, like reference numerals refer to like parts throughout the various figures and embodiments of the inventive concept.

In description of the inventive concept, detailed explanation of known related functions and constitutions may be omitted to avoid unnecessarily obscuring the subject manner of the inventive concept. Ordinal numbers (e.g. first, second, etc.) are used for description only, assigned to the elements in no particular order, and shall by no means specify the name of the pertinent element or restrict the claims.

The terminology used herein is for the purpose of describing particular embodiments only and is not intended to be limiting of the invention. It will be further understood that the terms "comprising" and/or "including," when used in this specification, specify the presence of stated features, integers, steps, operations, elements, and/or components, but do not preclude the presence or addition of one or more other features, integers, steps, operations, elements, components, and/or groups thereof.

Hereinafter, embodiments of the inventive concept will be described in detail with reference to the accompanying drawings.

FIG. 1 is a configuration diagram showing a distributed antenna system according to an embodiment of the inventive concept.

Referring to FIG. 1, the distributed antenna system 100 according to the embodiment of the inventive concept a master unit 120, and n remote units 130-1, 130-2, . . . , 130-n (n is a natural number). The master unit 120 may be connected to the base station 110 by wire and/or wireless to the master unit 120, and the n remote units 130-1, 130-2, . . . , 130-n (hereinafter, commonly referred to as 130-n) may be connected to the master unit 120 by wire and/or wireless to.

The distributed antenna system 100 may operate in time division duplex (TDD). Therefore, when the master unit 120 transmits a signal (i.e., a downlink signal) to the remote unit 130-n, the remote unit 130-n may not transmit a signal (i.e., an uplink signal) to the master unit 120. For example, if the base station 110 transmits a downlink signal to the master unit 120, the master unit 120 may transmit the downlink signal to each remote unit 130-n, and the remote unit 130-n receiving the downlink signal may not transmit, to the mater unit 120, an unlink signal received from a mobile communication terminal (hereinafter, referred to as a 'terminal'). If the reception of the downlink signal is ended, the remote unit 130-n may transmit the uplink signal to the mater unit 120. Accordingly, in the distributed antenna system 100, uplink and downlink signals can be alternately allocated in the same frequency band according to time sequence.

In this case, the master unit 120 and/or the remote unit 130-n may not include a switch for alternately allocating uplink and downlink signals, and therefore, it is unnecessary to generate a control signal for controlling the switch. Instead, the master unit 120 and/or the remote unit 130-n may include a passive element for branching uplink and downlink signals. Hereinafter, each component of the master unit 120 and the remote unit 130-n will be described in detail with reference to FIGS. 2 and 3.

Figure 2:
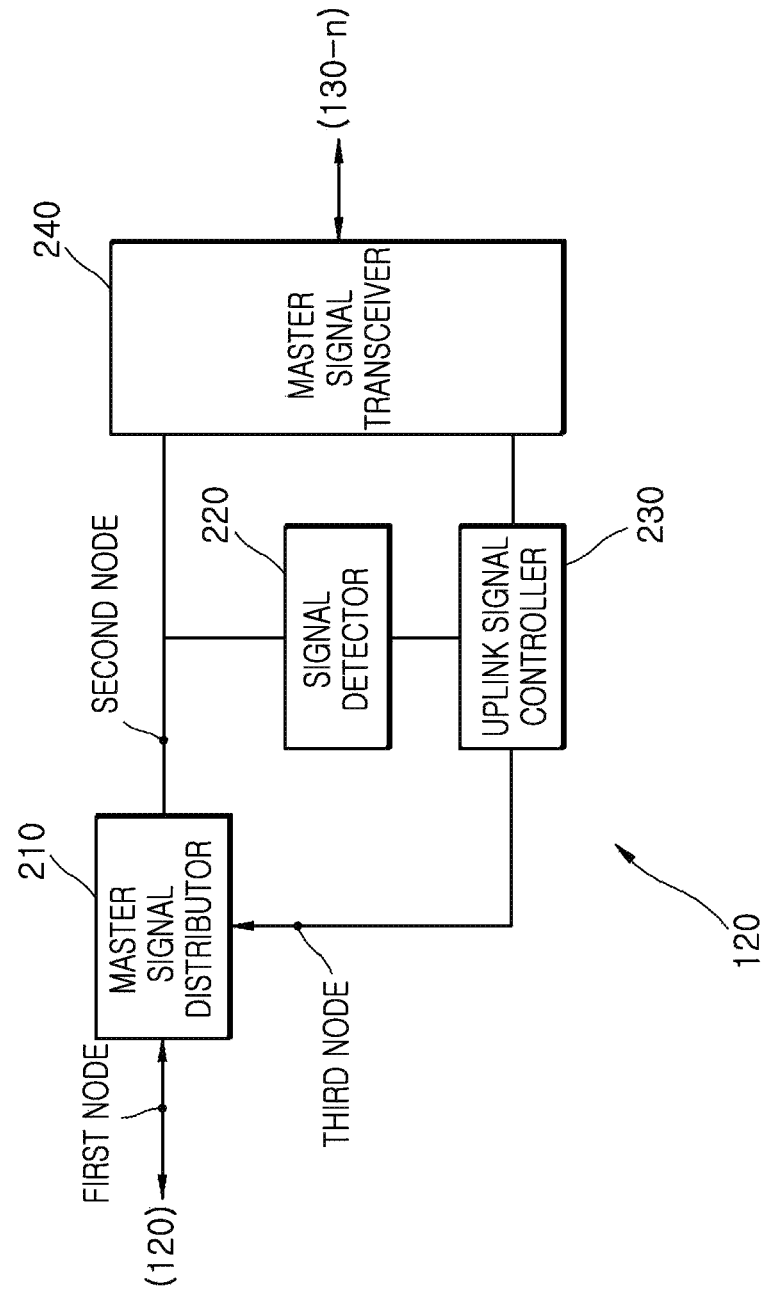
FIG. 2 is a block configuration diagram showing a master unit according to an embodiment of the inventive concept.
Figure 3:
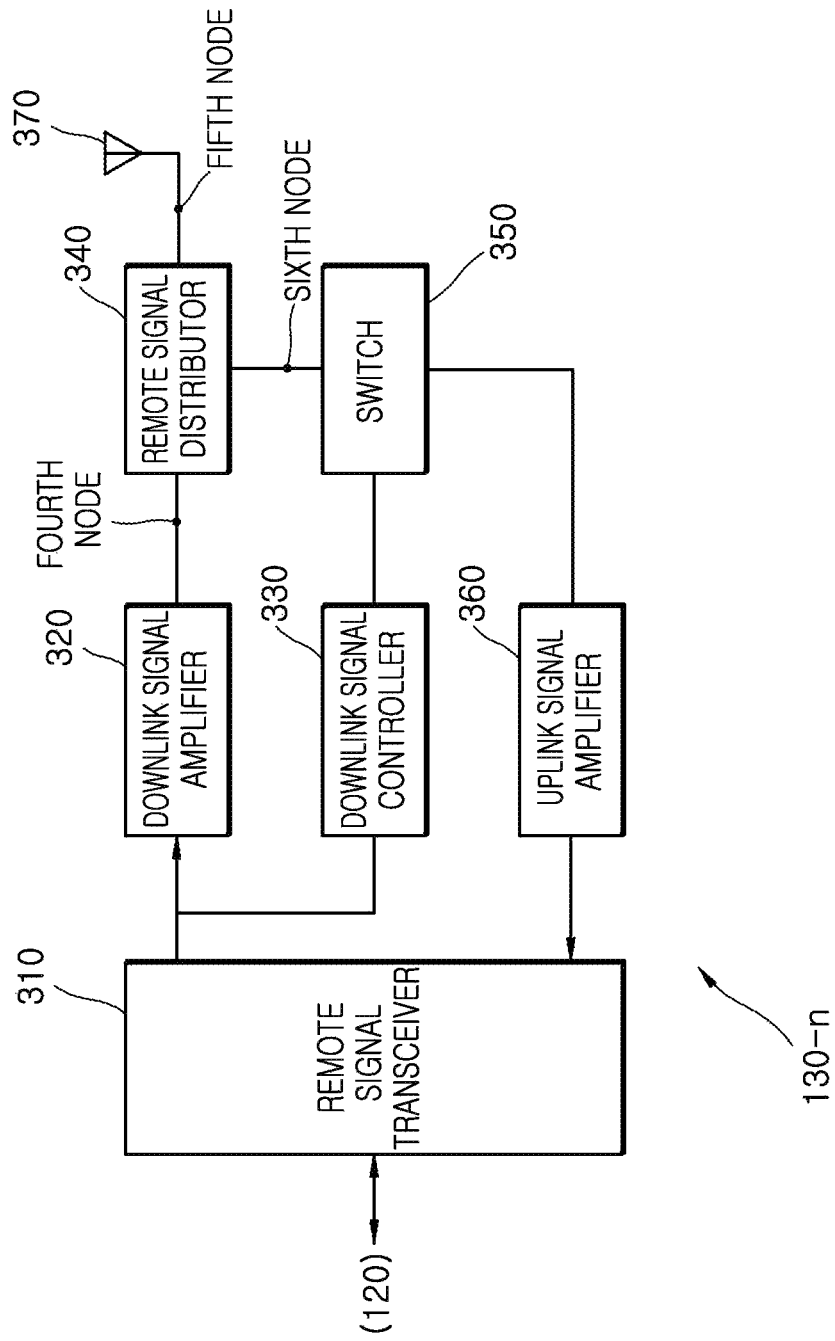
FIG. 3 is a block configuration diagram showing a remote unit according to an embodiment of the inventive concept.

FIG. 2 is a block configuration diagram showing a master unit according to an embodiment of the inventive concept. FIG. 3 is a block configuration diagram showing a remote unit according to an embodiment of the inventive concept.

Referring to FIG. 2, the master unit 120 according to the embodiment of the inventive concept includes a master signal distributor 210, a signal detector 220, an uplink signal controller 230, and a master signal transceiver 240. Referring to FIG. 3, the remote unit according to the embodiment of the inventive concept includes a remote signal transceiver 310, a downlink signal amplifier 320, a downlink signal controller 330, a remote signal distributor 340, a switch 350, an uplink signal amplifier 360, and an antenna 370. First, an operation in which the master unit 120 and the remote unit 130-n process a downlink signal will be described.

If a downlink signal is received from the base station 110, the master signal distributor 210 may receive the downlink signal input through a first node. Here, the master signal distributor 210 may include a circulator (hereinafter, referred to as a 'master circulator') that is a passive element. Thus, the master circulator 210 can output, to a second node, the downlink signal input through the first node. The master circulator 210 is a passive element of which input and output are recursively defined, and therefore, the downlink signal input to the first node is output to only the second node and may not be output to a third node.

If the downlink signal output to the second node is input, the master signal transceiver 240 may transmit the input downlink signal to the remote unit 130-n. The master signal transceiver 240 is a unit for transmitting a downlink signal to the remote unit 130-n and receiving an uplink signal from the remote unit 130-n. For example, it is assumed that the master signal transceiver 240 and the remote unit 130-n (particularly, the remote signal transceiver 310) are connected to each other through an optical transmission line. In this case, the master signal transceiver 240 may include a laser diode for converting a downlink signal as an electrical signal into an optical signal. Also, the master signal transceiver 240 may include a wavelength division multiplexer (WDM) for transmitting a downlink signal converted into the optical signal to the remote signal transceiver 310.

If a downlink signal is received from the master signal transceiver 240, the remote signal transceiver 310 may output the received downlink signal to the downlink signal amplifier 320 and/or the downlink signal controller 330. The remote signal transceiver 310 is a unit for receiving a downlink signal from the master unit 120 and transmitting an uplink signal to the mater unit 120. For example, it is assumed that the master signal transceiver 240 and the remote signal transceiver 310 are connected to each other through an optical transmission line. In this case, the remote signal transceiver 310 may include a wavelength division multiplexer (WDM) for receiving a downlink signal as an optical signal. Also, the remote signal transceiver 310 may include a photo diode for converting an optical signal into an electrical signal. Thus, the remote signal transceiver 310 can restore the downlink signal received as the optical signal to an electrical signal and output the restored signal to the downlink signal amplifier 320 and/or the downlink signal controller 330.

The downlink signal amplifier 320 may amplify the input downlink signal by using a predetermined gain. Hereinafter, the downlink signal amplified by the downlink signal amplifier 320 is referred to as a downlink amplification signal so as to distinguish the downlink signal from that received from the base station 110. The downlink signal amplifier 320 may output the generated downlink amplification signal to a fourth node.

The remote signal distributor 340 may output, to a fifth node, the downlink amplification signal input through the fourth node. Here, the remote signal distributor 340 may include a circulator (hereinafter, referred to as a 'remote circulator') that is a passive element. Thus, the remote circulator 340 can output, to the fifth node, the downlink amplification signal input through the fourth node. The remote circulator 340 is a passive element of which input and output are recursively defined, and therefore, the downlink signal input to the fourth node is output to only the fifth node and may not be output to a sixth node. Accordingly, the antenna 370 can output, to the outside, the downlink amplification signal input through the sixth node.

Meanwhile, the remote signal distributor 340 may be connected to the uplink signal amplifier 360 through the sixth node. In this case, when the downlink amplification signal input to the fourth node is leaked to the sixth node, there may occur a malfunction that the leaked downlink amplification signal (hereinafter, referred to as a 'downlink leakage signal') is input to the uplink signal amplifier 360 to be amplified, and then input to the master unit 120.

In order to prevent this malfunction, if a downlink signal is input from the remote signal transceiver 310, the downlink signal controller 330 may generate a downlink mode notification signal and output the generated downlink mode notification signal to the switch 350. Here, the downlink signal controller 330 may determine that the downlink signal has been input when the power level of a signal received from the remote signal transceiver 310 is measured, and the measured power level exceeds a predetermined level. If the downlink mode notification signal is input, the switch 350 may release the connection between the remote signal distributor 340 and the uplink signal amplifier 360. Accordingly, it is possible to prevent, in advance, the downlink leakage signal from being input to the uplink signal amplifier 360.

When the downlink signal is received to the remote unit 130-n, the switch 350 may release the connection between the remote signal distributor 340 and the uplink signal amplifier 360 in response to the downlink mode notification signal. Therefore, although an uplink signal is received from the terminal, the uplink signal may not be input to the uplink signal amplifier 360. Accordingly, in the distributed antenna system 100, uplink and downlink signals can be alternately allocated in the same frequency band according to time sequence. This is because the remote unit 130-n does not process the uplink signal while the master unit 120 is transmitting the downlink signal to the remote unit 130-n.

In the above, the operation in which the master unit 120 and the remote unit 130-n process the downlink signal has been described. Hereinafter, an operation in which the master unit 120 and the remote unit 130-n process an uplink signal will be described.

The antenna 370 may output an uplink signal received from the terminal to the remote signal distributor 340 through the fifth node. The remote signal distributor 340 may output, to the sixth node, the uplink signal input through the fifth node. As described above, the remote signal distributor 340 may include a remote circulator that is a passive element, and thus the uplink signal input through the fifth node can be output to only the sixth node. Also, as described above, the uplink signal output to the sixth node can be input to the uplink signal amplifier 360 only when any downlink signal is not received to the remote unit 130-*n*.

Therefore, if the input of a downlink signal from the remote signal transceiver 310 is ended, the downlink signal controller 330 may generate a downlink mode end signal and output the generated downlink mode end signal to the switch 350. Here, the downlink signal controller 330 may determine that the input of the downlink signal has been ended when the power level of a signal received from the remote signal transceiver 310 is measured, and the measured power level is equal to or smaller than a predetermined level. If the downlink mode end signal is input, the switch 350 may again connect the remote signal distributor 340 and the uplink signal amplifier 360 to each other. Accordingly, the uplink signal output to the sixth node can be input to the uplink signal amplifier 360.

The uplink signal amplifier 360 may amplify the input uplink signal by using a predetermined gain. Hereinafter, the uplink signal amplified by the uplink signal amplifier 360 is referred to as an uplink amplification signal so as to distinguish the uplink signal from that received from the terminal.

If the uplink amplification signal is input from the uplink signal amplifier 360, the remote signal transceiver 310 may the uplink amplification signal to the mater unit 120. For example, it is assumed that the remote signal transceiver 310 and the master unit 120 (particularly, the master signal transceiver 240) are connected to each other through an optical transmission line. In this case, the remote signal transceiver 310 may include a laser diode for converting the uplink amplification signal as an electrical signal into an optical signal. Also, the remote signal transceiver 310 may include a wavelength division multiplexer (WDM) for transmitting, to the master signal transceiver 240, the uplink amplification signal converted into the optical signal.

If the uplink amplification signal is received from the remote signal transceiver 310, the master signal transceiver 240 may output the uplink amplification signal to the uplink signal controller 230. For example, it is assumed that the remote signal transceiver 310 and the mater signal transceiver 240 are connected to each other through an optical transmission line. In this case, the master signal transceiver 240 may include a wavelength division multiplexer (WDM) for receiving the uplink amplification signal as the optical signal. Also, the master signal transceiver 240 may include a photo diode for converting an optical signal into an electrical signal. Thus, the master signal transceiver 240 may restore the uplink amplification signal received as the optical signal into an electrical signal and output the restored signal to the uplink signal controller 230.

The uplink signal controller 230 may output the input uplink amplification signal to the third node. The master signal distributor 210 may output, to the first node, the uplink amplification signal input through the third node. The master signal distributor 210 may include a master circulator that is a passive element, and the master circulator 210 may output, to the first node, the uplink amplification signal input through the third node. The master circulator 210 is a passive element of which input and output are recursively defined, and therefore, the uplink amplification signal input to the third node is output to only the first node and may not be output to the second node. Accordingly, the uplink amplification signal can be transmitted to the base station 110.

Meanwhile, when the uplink amplification signal input to the third node is leaked to the second node, there may occur a malfunction that the leaked uplink amplification signal (hereinafter, referred to as an 'uplink leakage signal') is transmitted to the remote unit 130-*n*. That is, the uplink leakage signal acts as a noise component of a downlink signal, and therefore, may have influence on characteristics of the downlink signal.

In order to prevent this malfunction, the signal detector 220 may detect the uplink leakage signal leaked to the second node. For example, if the uplink amplification signal is input from the master signal transceiver 240, the uplink signal controller 230 may generate an uplink mode notification signal and output the generated uplink mode notification signal to the signal detector 220. If a signal is detected from the second node after the uplink mode notification signal is input, the signal detector 220 may determine the signal as the uplink leakage signal. For example, when the power of the signal detected at the second node exceeds a predetermined first power and is less than a predetermined second power, the signal detector 220 may determined the signal as the uplink amplification signal (here, the second power is a positive real number greater than the first power). This is because it is highly likely that the signal will be a general noise when the power of the signal detected at the second node is less than the first power, and it is highly likely that the signal is a downlink signal when the power of the signal detected at the second node is greater than the second power.

Also, the signal detector 220 may transmit, to the uplink signal controller 230, information (hereinafter, referred to as 'uplink leakage signal information') on a measured power level of the detected uplink leakage signal. Therefore, the uplink signal controller 230 may adjust, to a predetermined level, the power level of an uplink amplification signal input corresponding to the uplink leakage signal information. For example, if the uplink signal controller 230 is previously set to attenuate the power level of the uplink amplification signal in proportion to the magnitude of the uplink leakage signal information, the uplink signal controller 230 may attenuate the power level of the uplink amplification signal, corresponding to the magnitude of the uplink leakage signal information. This is because as the power level of the uplink amplification signal is too high, the uplink leakage signal is detected. In this case, the uplink signal controller 230 may include an attenuator.

On the contrary when the uplink leakage signal information corresponds to '0,' the uplink signal controller 230 may gradually increase the power level of the uplink amplification signal (until the uplink leakage signal is detected). This is because the power level of the uplink amplification signal may be too low. Therefore, the uplink signal controller 230 may include an amplifier. According to the above-described operation of the signal detector 220 and the uplink signal controller 230, it is possible to eliminate an uplink leakage signal that may be generated by the master circulator 210.

As described above, in the distributed antenna system 100 according to the embodiment of the inventive concept, the transmission path of a signal is changed by using a passive element such as a circulator. Hence, a switch for changing the transmission path of a signal and a control signal for controlling the switch are not required. Also, in the distributed antenna system 100 according to the embodiment of the inventive concept, a switch and a controller, which are relatively high-priced components, are removed, so that it is possible to reduce manufacturing cost and remove malfunctions of the switch and the controller.

Hereinafter, a case where the master unit 120 and the nth remote unit 130-*n* are connected to each other through an optical transmission line according to an embodiment of the inventive concept will be described with reference to FIG. 4.

Figure 4:
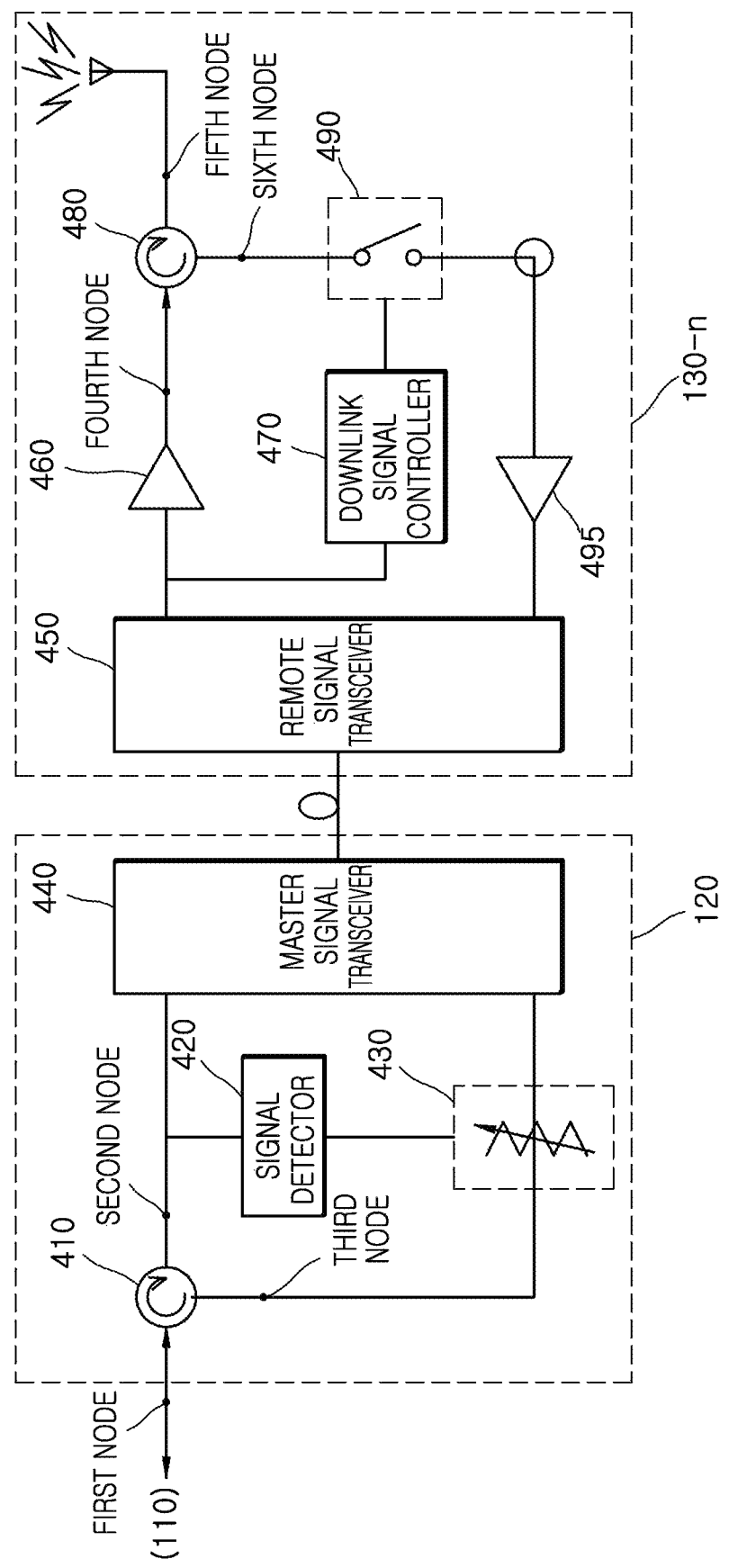
FIG. 4 is a circuit configuration diagram showing a case where the master unit and the remote unit are connected to each other according to an embodiment of the inventive concept.

FIG. 4 is a circuit configuration diagram showing a case where the master unit and the remote unit are connected to each other according to an embodiment of the inventive concept.

Referring to FIG. 4, a downlink signal received from the base station 110 may be input to a master circulator 410 through a first node. The downlink signal input to the master circulator 410 through the first node may be output to a second node and then input to a master signal transceiver 440. The master signal transceiver 440 may convert the input downlink signal into an optical signal and transmit the converted optical signal to a remote signal transceiver 450. The remote signal transceiver 450 may convert the downlink signal input as the optical signal into an electrical signal and output the converted electrical signal to a downlink signal amplifier 460 and/or a downlink signal controller 470.

The downlink signal amplifier 460 may amplify the input downlink signal by using a predetermined gain and then generate a downlink amplification signal. The downlink signal amplifier 460 may output the generated downlink amplification signal to a fourth node. A remote circulator 480 may output the downlink amplification signal input through the fourth node to a fifth node such that the output downlink amplification signal can be transmitted to the outside through an antenna.

If the downlink signal is input from the remote signal transceiver 450, the downlink signal controller 470 may generate a downlink mode notification signal and output the generated downlink mode notification signal to a switch 490 so as to prevent the downlink amplification signal from being leaked to a sixth node from the remote circulator 480 and input to an uplink signal amplifier 495. If the downlink mode notification signal is input, the switch 490 may release the connection between the remote circulator 430 and the uplink signal amplifier 495. Accordingly, it is possible to prevent, in advance, the downlink leakage signal from being input to the uplink signal amplifier 495.

When a downlink signal is received to the remote unit 130n, the switch 350 can release the connection between the remote signal distributor 340 and the uplink signal amplifier 360 in response to the downlink mode notification signal. Therefore, although an uplink signal is received from the terminal, the uplink signal may not be input to the uplink signal amplifier 360. Accordingly, in the distributed antenna system 100, uplink and downlink signals can be alternately allocated in the same frequency band according to time sequence.

The uplink signal received from the terminal may be input to the remote circulator 480 through the fifth node. The remote circulator 480 may output, to the sixth node, the uplink signal input through the fifth node. In this case, the switch 490 may receive a downlink mode end signal input from the downlink signal controller 470 to connect the remote circulator 480 and the uplink signal amplifier 495 to each other. Thus, the uplink signal output to the sixth node can be input to the uplink signal amplifier 495.

The uplink signal amplifier 495 may generate an uplink amplification signal by amplifying the input uplink signal by using a predetermined gain, and output the generated uplink amplification signal to the remote signal transceiver 450. The remote signal transceiver 450 may convert the input uplink amplification signal into an optical signal and transmit the converted optical signal to the master signal transceiver 440. The master signal transceiver 440 may output the input uplink amplification signal to the uplink signal controller 430.

The uplink signal controller 430 may output the input uplink amplification signal to a third node. The uplink amplification signal input to the master circulator 410 through the third node may be output to the first node to be transmitted to the base station 110. In this case, the uplink signal controller 430 may adjust the power level of the uplink amplification signal to a predetermined level by using uplink leakage signal information received from a signal detector 420, and output the uplink amplification signal having the adjusted power level to the third node. That is, when the uplink leakage signal information received from the signal detector 420 is '0,' the uplink signal controller 430 may gradually increase the power level of the uplink amplification signal, corresponding to the uplink leakage signal information. When the uplink leakage signal information received from the signal detector 420 is not '0,' the uplink signal controller 430 may gradually attenuate the power level of the uplink amplification signal, corresponding to the uplink leakage signal information.

While the inventive concept has been described with respect to the specific embodiments, it will be apparent to those skilled in the art that various changes and modifications may be made without departing from the spirit and scope of the inventive concept as defined in the following claims.

What is claimed is:
1. A master unit, comprising:
   a signal distributor configured to output, to a second node, a downlink signal input through a first node, and output, to the first node, an uplink signal input through a third node such that the downlink signal and the uplink signal are output at different times;
   a signal transceiver configured to output, to outside of the master unit, the downlink signal input through the second node, and output, to the third node, the uplink signal received from the outside of the master unit;
   a signal power detector circuit configured to detect a power level of the uplink signal being input through the third node and leaking to the second node through the signal distributor while the downlink signal is not output to the second node; and
   an uplink signal controller configured to adjust the uplink signal based on a detected result of the signal power detector circuit.

2. A master unit of claim 1, wherein the signal distributor includes a circulator.

3. A master unit of claim 1, wherein the uplink signal controller adjusts the power level of the uplink signal based on the detected result of the signal power detector circuit.

4. A distributed antenna system, comprising:
   a master unit configured to transmit a downlink signal received from a base station; and
   a remote unit configured to generate a downlink amplification signal by amplifying the downlink signal, transmit the downlink amplification signal to the outside, and to generate a uplink amplification signal by amplifying an uplink signal,
   wherein the master unit includes:
   a master circulator configured to output, to a second node, the downlink signal input through a first node, and output, to the first node, the uplink amplification signal input through a third node such that the downlink signal and the uplink signal are output at different times;
   a signal power detector circuit configured to detect a power level of the uplink amplification signal being input through the third node and leaking to the second node through the master circulator while the downlink signal is not output to the second node; and an uplink signal controller configured to adjust the uplink amplification signal based on a detected result of the signal power detector circuit.

5. The distributed antenna system of claim 4, wherein the remote unit includes, a remote signal transceiver configured to output the downlink signal received from the master unit;

a downlink signal amplifier configured to generate the downlink amplification signal by amplifying the downlink signal, and output the downlink amplification signal to a fourth node;

a remote circulator configured to output, to a fifth node, the downlink amplification signal input through the fourth node;

a downlink signal controller configured to, if the downlink signal is input through the remote signal transceiver, output a downlink mode notification signal; and a switch configured to, if the downlink mode notification signal is input, disconnect the remote circulator and an uplink signal amplifier.

6. The distributed antenna system of claim 5, wherein the remote unit further includes the uplink signal amplifier configured to generate the uplink amplification signal by amplifying the uplink signal input through a sixth node, and output the uplink amplification signal, wherein, if the uplink signal received from a terminal is input through the fifth node, the remote circulator outputs the uplink signal to the sixth node, and wherein the remote signal transceiver outputs the uplink amplification signal to the master unit.

7. The distributed antenna system of claim 5, wherein, if the detection of the downlink signal is ended, the downlink signal controller outputs a downlink mode end signal, and wherein, if the downlink mode end signal is input, the switch connects the signal distributor and the uplink signal amplifier to each other.

8. The distributed antenna system of claim 5, wherein the master unit further includes a master signal transceiver outputs the received uplink amplification signal to the third node, and the master circulator outputs, to the first node, the uplink amplification signal input through the third node.

9. The distributed antenna system of claim 6, wherein the uplink signal controller adjust the power level of the uplink amplification signal to a predetermined level, based on the detected result of the signal power detector circuit.

* * * * *